US011561765B2

(12) United States Patent
Howard et al.

(10) Patent No.: US 11,561,765 B2
(45) Date of Patent: Jan. 24, 2023

(54) SCALABLE INPUT/OUTPUT SYSTEM AND TECHNIQUES TO TRANSMIT DATA BETWEEN DOMAINS WITHOUT A CENTRAL PROCESSOR

(71) Applicant: Intel Corporation, Santa Clara, CA (US)

(72) Inventors: John Howard, Hillsboro, OR (US); Steven B. McGowan, Portland, OR (US); Krzysztof Perycz, Chmielno (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/384,496

(22) Filed: Jul. 23, 2021

(65) Prior Publication Data

US 2022/0050662 A1 Feb. 17, 2022

Related U.S. Application Data

(63) Continuation of application No. 16/819,772, filed on Mar. 16, 2020, now Pat. No. 11,074,042, which is a
(Continued)

(51) Int. Cl.
*G06F 5/06* (2006.01)
*G06F 13/28* (2006.01)
(Continued)

(52) U.S. Cl.
CPC ................ *G06F 5/065* (2013.01); *G06F 5/14* (2013.01); *G06F 13/1673* (2013.01);
(Continued)

(58) Field of Classification Search
CPC ............. G06F 13/4004; G06F 13/4009; G06F 13/4018; G06F 13/387; G06F 13/28;
(Continued)

(56) References Cited

U.S. PATENT DOCUMENTS 5,408,605 A 4/1995 Deering
3,161,212 A1 4/2012 Lu et al.
(Continued)

FOREIGN PATENT DOCUMENTS

CN 1910571 2/2007
CN 103221937 7/2013
(Continued)

OTHER PUBLICATIONS

United States Patent and Trademark Office, "Notice of Allowance," mailed in connection with U.S. Appl. No. 16/182,932, dated Nov. 4, 2019, 5 pages.

(Continued)

*Primary Examiner* — Raymond N Phan
(74) *Attorney, Agent, or Firm* — Hanley, Flight & Zimmerman, LLC

(57) ABSTRACT

An apparatus for managing input/output (I/O) data may include a streaming I/O controller to receive data from a load/store domain component and output the data as first streaming data of a first data type comprising a first data movement type and first data format type. The apparatus may also include at least one accelerator coupled to the streaming I/O controller to receive the first streaming data, transform the first streaming data to second streaming data having a second data type different than the first data type, and output the second streaming data. In addition, the apparatus may include a streaming interconnect to conduct the second data to a peer device configured to receive data of the second data type.

22 Claims, 9 Drawing Sheets

Application 706
USB Storage Class Driver 708
Networking Stack 712
USB Bus Driver Stack 710
WNIC Driver 714
730
Streaming I/O Controller 716
RNIC 718
734
Streaming Interconnect 720
Backup Accelerator 722
Storage Sharing Accelerator 724
USB Accelerator 726
702
732
700
728

Related U.S. Application Data continuation of application No. 16/182,932, filed on Nov. 7, 2018, now Pat. No. 10,592,205, which is a continuation of application No. 15/039,934, filed as application No. PCT/US2013/078006 on Dec. 27, 2013, now Pat. No. 10,127,012.

(51) Int. Cl.
*G06F 13/16* (2006.01)
*G06F 13/40* (2006.01)
*G06F 5/14* (2006.01)

(52) U.S. Cl.
CPC .......... *G06F 13/28* (2013.01); *G06F 13/4027* (2013.01); *G06F 2205/067* (2013.01); *G06F 2205/126* (2013.01); *Y02D 10/00* (2018.01)

(58) Field of Classification Search
CPC ............. G06F 13/4027; G06F 13/1673; G06F 14/065; G06F 2205/067; G06F 2205/126; G06F 5/14; G06F 5/065
See application file for complete search history.

(56) References Cited

U.S. PATENT DOCUMENTS

| | | | | |
|---|---|---|---|---|
| 10,127,012 | B2 | 11/2018 | Howard et al. | |
| 10,592,205 | B2 | 3/2020 | Howard et al. | |
| 11,074,042 | B2 | 7/2021 | Howard et al. | |
| 2002/0161911 | A1* | 10/2002 | Pinckney, III | H04N 21/6587 348/E5.008 |
| 2006/0037072 | A1 | 2/2006 | Rao et al. | |
| 2010/0042239 | A1 | 2/2010 | Moore et al. | |
| 2010/0325299 | A1 | 12/2010 | Rao et al. | |
| 2012/0131309 | A1 | 5/2012 | Johnson et al. | |
| 2013/0007375 | A1 | 1/2013 | Auernhammer et al. | |
| 2013/0156101 | A1* | 6/2013 | Lu | H04N 19/44 375/E7.246 |
| 2013/0166874 | A1 | 6/2013 | Auernhammer et al. | |

FOREIGN PATENT DOCUMENTS

| | | |
|---|---|---|
| EP | 0627699 | 12/1994 |
| TW | 201135465 | 10/2011 |

OTHER PUBLICATIONS

United States Patent and Trademark Office, "Non-final Office Action," mailed in connection with U.S. Appl. No. 16/182,932, dated May 16, 2019, 14 pages.

United States Patent and Trademark Office, "Notice of Allowance," mailed in connection with U.S. Appl. No. 15/039,934, dated Jul. 12, 2018, 5 pages.

United States Patent and Trademark Office, "Non-final Office Action," mailed in connection with U.S. Appl. No. 15/039,934, dated Dec. 14, 2017, 15 pages.

International Searching Authority, "International Search Report," mailed in connection with International Patent Application No. PCT/US2013/078006, dated Sep. 18, 2014, 5 pages.

European Patent Office, "Extended European Search Report," mailed in connection with European Patent Application No. 13900166.3, dated Aug. 16, 2017, 7 pages.

United States Patent and Trademark Office, "Notice of Allowance," mailed in connection with U.S. Appl. No. 16/819,772, dated Apr. 12, 2021, 10 pages.

State Intellectual Property Office "Notification of Grant" issued in connection with CN Application No. 201380081287.9, dated Mar. 27, 2019, 3 pages.

State Intellectual Property Office "Office Action" issued in connection with CN Application No. 201380081287.9, dated Aug. 24, 2018, 13 pages (Non-English).

Taiwan IPO "Search Report" issued in connection with TW Application No. 103140998, dated Oct. 29, 2015, 1 page (Non-English).

Taiwan IPO "Notice of Allowance" issued in connection with TW Application No. 103140998, dated Jan. 30, 2016, 3 pages.

International Searching Authority, "International Preliminary Report on Patentability," mailed in connection with International Patent Application No. PCT/US2013/078006, dated Jun. 28, 2016, 5 pages.

European Patent Office, "Communication under Rule 71(3) EPC," mailed in connection with European U.S. Appl. No. 13/900,166 3, dated Nov. 19, 2018, 40 pages.

European Patent Office, "Decision to Grant," mailed in connection with European U.S. Appl. No. 13/900,166 3, dated Apr. 11, 2019, 2 pages.

* cited by examiner

300

600

SCALABLE INPUT/OUTPUT SYSTEM AND TECHNIQUES TO TRANSMIT DATA BETWEEN DOMAINS WITHOUT A CENTRAL PROCESSOR

RELATED APPLICATIONS

This patent arises from a continuation of U.S. patent application Ser. No. 16/819,772 (now U.S. Pat. No. 11,074, 042), which is titled "SCALABLE INPUT/OUTPUT SYSTEM AND TECHNIQUES TO TRANSMIT DATA BETWEEN DOMAINS WITHOUT A CENTRAL PROCESSOR," and which was filed on Mar. 16, 2020, which is a continuation of U.S. patent application Ser. No. 16/182, 932 (now U.S. Pat. No. 10,592,205), which is titled "SCALABLE INPUT/OUTPUT SYSTEM AND TECHNIQUES TO TRANSMIT DATA BETWEEN DOMAINS WITHOUT A CENTRAL PROCESSOR," and which was filed on Nov. 7, 2018, which is a continuation of U.S. patent application Ser. No. 15/039,934 (now U.S. Pat. No. 10,127,012), which is titled "SCALABLE INPUT/OUTPUT SYSTEM AND TECHNIQUES TO TRANSMIT DATA BETWEEN DOMAINS WITHOUT A CENTRAL PROCESSOR," and which was filed on May 27, 2016, which corresponds to the national stage entry of International Patent Application No. PCT/US13/78006, filed on Dec. 27, 2013. U.S. patent application Ser. No. 16/819,772, U.S. patent application Ser. No. 16/182,932, U.S. patent application Ser. No. 15/039,934 and International Patent Application No. PCT/US13/78006 are hereby incorporated herein by reference in their respective entireties.

TECHNICAL FIELD

The present embodiments are related to data processing and more particularly to scalable input/output architecture.

BACKGROUND

Historically personal computers (PCs) have been designed around a model in which a general processor (CPU) processes all data that enters or leaves the system. Relatively simple Input/Output (I/O) Controllers are used to move data from external I/O data sources into memory for processing by the CPU, and to move the processed data from memory to external I/O data sinks. Virtually all I/O data enters or exits a platform as a stream of data units, whether as network data from the "cloud," audio samples from a microphone or output to speakers, blocks of data from a disk, etc. The conventional I/O controllers simply move streams of native data units between I/O devices to main memory so that the CPU can manipulate the data.

PC architecture has recently been rapidly evolving to adapt to needs of mobile platforms, which are extremely sensitive to power efficiency. It has been demonstrated that there are many mobile usage models where it is more power efficient to implement specialized hardware functions (Accelerators) to process data, than it is to use employ a CPU. Most accelerators process I/O data as sequential streams of data units to and from memory. For example, in a common MPEG-2 Audio Layer III (MP3) playback scenario, an I/O controller is used to stream Ethernet frames that encapsulate an MP3 file from a remote source into a memory buffer. A first accelerator then may be employed to input the Ethernet Frames from memory and output MP3 encoded data to another memory buffer. A second accelerator may input MP3 data from memory and output audio samples back to yet another memory buffer. Finally another I/O controller may be employed to retrieve the audio samples from memory and output them to playback devices such as headphones.

A typical scenario for treating I/O is thus one in which a CPU configures an I/O controller to transfer I/O data into memory, configures one or more accelerators to process that data, and another I/O controller to output the data. In this scenario memory is used simply as a first-in first-out (FIFO) device for the data that is streamed between I/O controllers and accelerators. Another notable feature of current I/O controllers and accelerators is that each defines a unique method of moving data in and out of memory. This model requires a unique device program (driver) for each device in order to move data, as well as a higher level application to coordinate the drivers so that the data is passed between them in a first-in-first-out (FIFO) manner.

In present day architecture, the software configuration process of devices in an I/O pipeline may take place once for a given I/O operation, e.g., playing an MP3 file. However, device driver data management activity may occur at a frequency that is a function of the data rate and the size of FIFO buffers used to store data. Often FIFO buffers have been arranged with a small size in order to reduce the latency between devices, which results in an increase in the frequency of software activity. Recently new device or platform management has been developed to maximize system idle times to enable longer and deeper sleep states. To accomplish this, large hardware FIFO buffers may be added to I/O controllers so that they can burst large amounts of I/O data from main memory with a lower frequency, to minimize device driver data management activity, which may increase latency.

DETAILED DESCRIPTION

Figure 1:
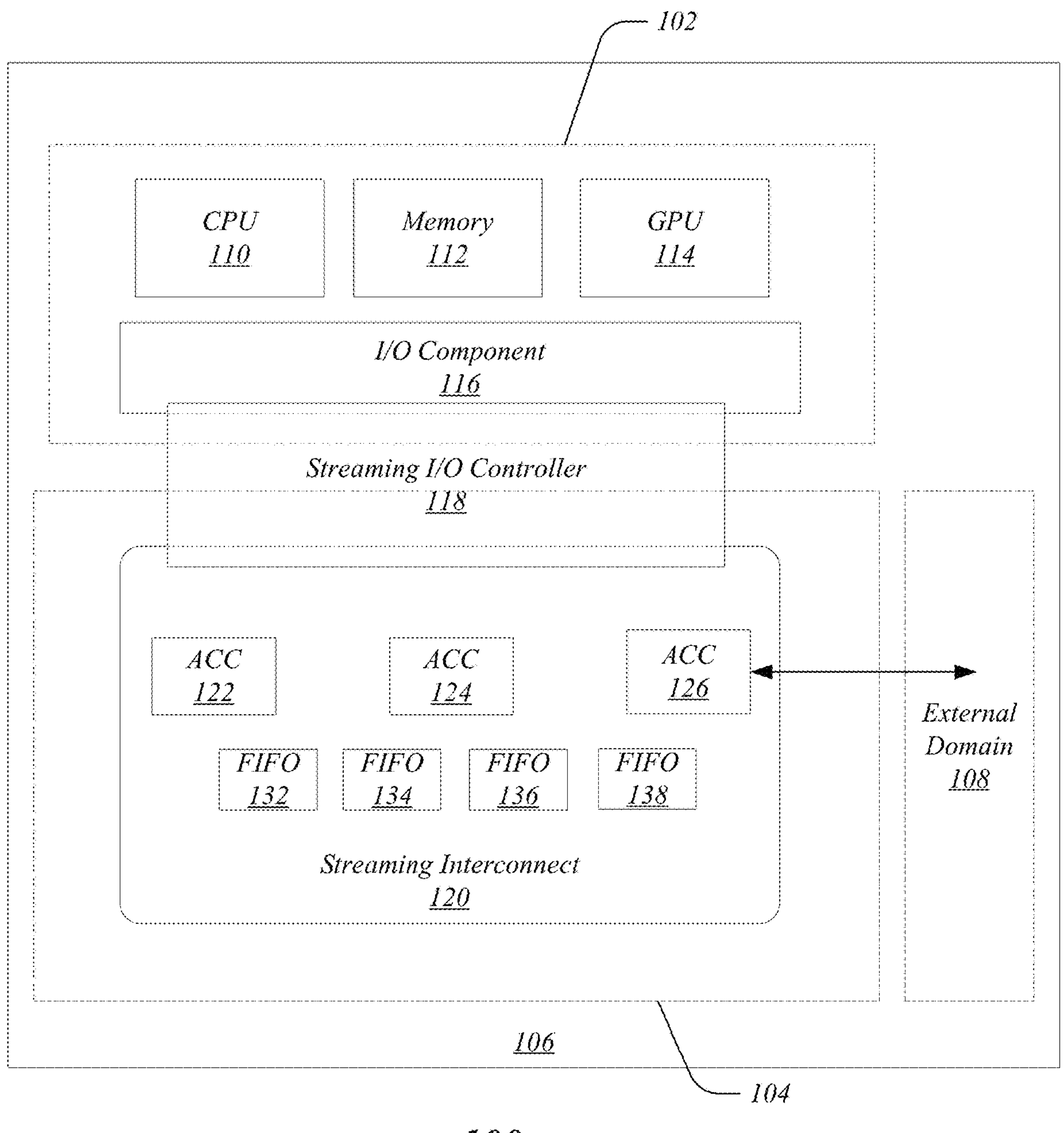
FIG. 1 depicts an SIO architecture consistent with various embodiments.

Embodiments provide an architecture, components and techniques for managing input/output (I/O) data, and in particular for handling I/O data streams in a power efficient manner In various embodiments a Scalable I/O (SIO) architecture is provided that includes a novel I/O streaming domain that interacts with a load/store domain to process I/O data more efficiently. Operation of various embodiments is detailed with respect to the FIGS. to follow. However, in brief the scalable I/O architecture may include any number of the following characteristics. For one, the SIO architecture may be backwardly compatible with conventional I/O architectures; may support native data type of I/O streaming;

and may eliminate the need to use system memory as a FIFO buffer. The SIO architecture may move data to or from memory only if a processor such as a CPU is to manipulate the data, while otherwise bypassing the movement of data into and out of system memory. In particular, the SIO architecture may provide a "FIFO pool" for buffering of I/O data streams outside of main system random access memory (RAM).

In various embodiments, the SIO architecture may include multiple individual, low latency, hardware FIFO buffers that offer a high degree of flexibility. These buffers may be dynamically created and sized, and subsequently connected between I/O Controllers and Accelerators to best match the requirements of a specific I/O operation. Once an I/O operation is complete the FIFOs may be reconfigured for another I/O operation.

Moreover, the SIO architecture may provide the following advantages over conventional I/O architecture. The SIO architecture may minimize latency between I/O controllers and accelerators. The SIO architecture may facilitate retasking of other type of hardware FIFO buffers such as "System on Chip Duty Cycle" buffers previously dedicated to individual I/O controllers and accelerators. This may be accomplished by moving such FIFO buffers into a pool that can be dynamically allocated to different devices as function of workload, to maximize hardware utilization and system idle time.

The SIO architecture may also define a standard architectural method for hardware peer-to-peer transfers between I/O controllers and accelerators, eliminating the requirement for active software involvement in device to device transfers. The SIO architecture may reduce or eliminate the need for point accelerator solutions, i.e., a specific point problem having logic that is largely not reusable for other problems. In various embodiments the SIO architecture may be deployed on personal computer (PC) devices, servers, or mobile devices. In particular, the SIO architecture may scale across system on a chip (SoC), inter-chip, and inter-platform boundaries. Another advantage provided by SIO architecture of the present embodiments is the clean partitioning of the movement of I/O data through a platform from the processing of that I/O data. In performing one or more of the above features, the SIO architecture may leverage conventional I/O stacks so that any required enabling and validation is minimized, thereby preserving conventional software, technology, and product investments that may be associated with platforms in which the SIO architecture is deployed.

FIG. 1 depicts an SIO architecture 100 consistent with various embodiments. The SIO architecture 100 includes separate domains for processing I/O data which are termed herein a load/store domain 102 and an I/O streaming domain 104. The load/store domain 102 may be linked to the I/O streaming domain 104 at least through a streaming I/O controller 118. In the embodiment of FIG. 1 the load/store domain 102 and I/O streaming domain 104 are included in a platform 106, which may be a PC, computer server, laptop computer, netbook, tablet device, smartphone, or other mobile device. The embodiments are not limited in this context. The load/store domain 102 may include a general processor circuitry (CPU 110), memory 112, graphics processor unit (GPU) 114. The load/store domain 102 may include other components (not shown) including those that the CPU 110 can access via memory (load and store) transactions.

In operation, the SIO architecture 100 may implement two major mechanism: a data plane and control plane (not separately shown). A data plane represents the plane for transporting data within the streaming domain 104 and for transporting data to and from the load/store domain 102. A control plane functions to configure and monitor components of the data plane.

The load/store domain 102 may include at least one I/O device, shown as I/O component 116. The I/O component 116 may present memory mapped registers or interact directly with the memory 112, for example, via direct memory access (DMA) operations. As such the load/store domain 102 may present a conventional arrangement of components that may perform various hardware functions that utilize main memory such as memory 112 in order to interface with one another or with the CPU 110.

Turning now to the I/O streaming domain 104, this domain may be provided with at least one I/O controller, shown as the streaming I/O controller 118. The I/O streaming domain 104 may also include at least one accelerator shown as accelerators (ACC) 122,124,126 in FIG. 1.

An accelerator may represent a type of I/O hardware device that operates to process streaming data in an I/O streaming domain (accelerators 122-124) or to input or output streaming data (accelerator 126) to an external domain 108. In addition, the I/O streaming domain may include at least one streaming interconnect, shown as streaming interconnect 120, whose operation is detailed below. In various embodiments, an I/O controller of the I/O streaming domain 104, such as the streaming I/O controller 118, may provide an architectural interface to the load/store domain 102 as illustrated in FIG. 1. The architectural interface may allow the CPU 110 to discover and configure accelerators that reside in the I/O streaming domain 104, such as the accelerators 122-126. Additionally, the streaming I/O controller 118 may translate data transfer semantics of the load/store domain 102 into data transfer semantics of the I/O streaming domain 104, or may translate data transfer semantics of the I/O streaming domain 104 into data transfer semantics of the load/store domain 102. Moreover, the streaming I/O controller 118 may present streaming inputs and outputs to the streaming interconnect 120 that move data into or out of memory buffers present in the load/store domain 102.

In operation, the accelerators of an I/O streaming domain, such as the accelerators 122, 124, 126 may transform information streaming between inputs and outputs processed by the I/O streaming domain 104. In some embodiments, an accelerator, such as any of the accelerators, 122,124, 126, may perform functions of an I/O controller. These include managing protocols, signaling or other operations that are needed to move data from an external I/O data source to an input, or to move data from an output to an external I/O data sink.

As illustrated in FIG. 1 the I/O streaming domain 104 may further include multiple FIFO buffers which are exemplified by the FIFO buffers 132, 134, 136, 138. The FIFO buffers 132-138 each may be a low latency, hardware FIFO that can be dynamically created and sized, and subsequently connected between components of the I/O streaming domain such as the SIO controller 118, and accelerators 122-128. The creation, sizing and linking of FIFO buffers may be performed to best match the requirements of a specific I/O operation. Once an I/O operation is complete a FIFO buffer may be reconfigured for another I/O operation. This may serve to minimize latency between the SIO controller 118 and accelerators 132-138, as well better distribute workload across multiple devices to maximize hardware utilization and system idle time.

Turning now to the streaming interconnect 120, this component may be embodied in any combination of software and hardware to provide a communications transport and protocol between accelerators and I/O controllers that is capable of spanning boundaries between hardware components such as SoC boundaries and platform boundaries. Streaming inputs and outputs may be processed by the streaming interconnect 120 and may be typed at two levels. A first type is data movement, which identifies the characteristics that are specific to transporting data over a streaming connection, such as Quality of Service (QoS), bandwidth, and so forth. Data movement information may be used by the streaming interconnect 120 and any devices that connect to streaming interconnect 120 to manage streaming data transfers between inputs and outputs. A second type is data format which identifies the format and other characteristics of the streaming data that are not related to its movement. Data format information may be used by accelerators such as accelerators 122, 124, 126, and system software in the event that a data stream is terminated in system memory such as memory 112, by moving the data stream through an I/O controller, such as the streaming I/O controller 118. Consistent with the present embodiments, the I/O streaming domain may be arranged so that only streaming inputs and outputs having compatible data movement and data format types may exchange information through the streaming interconnect 120. The streaming interconnect 120 may in particular ensure QoS requirements for inputs and outputs processed through the streaming I/O domain 104, as well as ensure secure delivery of information between inputs and outputs.

Although not depicted in FIG. 1, in various embodiments multiple I/O Controllers may be attached to a given streaming domain, and may connect to the given streaming domain to the same load/store domain. In other embodiments multiple I/O controllers may connect a given streaming domain to multiple different load/store domains. A hallmark of the present embodiments is the modularity and scalability of architecture components such as I/O controllers and streaming domains. Further embodiments that emphasize scalability of SIO architecture are discussed below.

Figure 2:
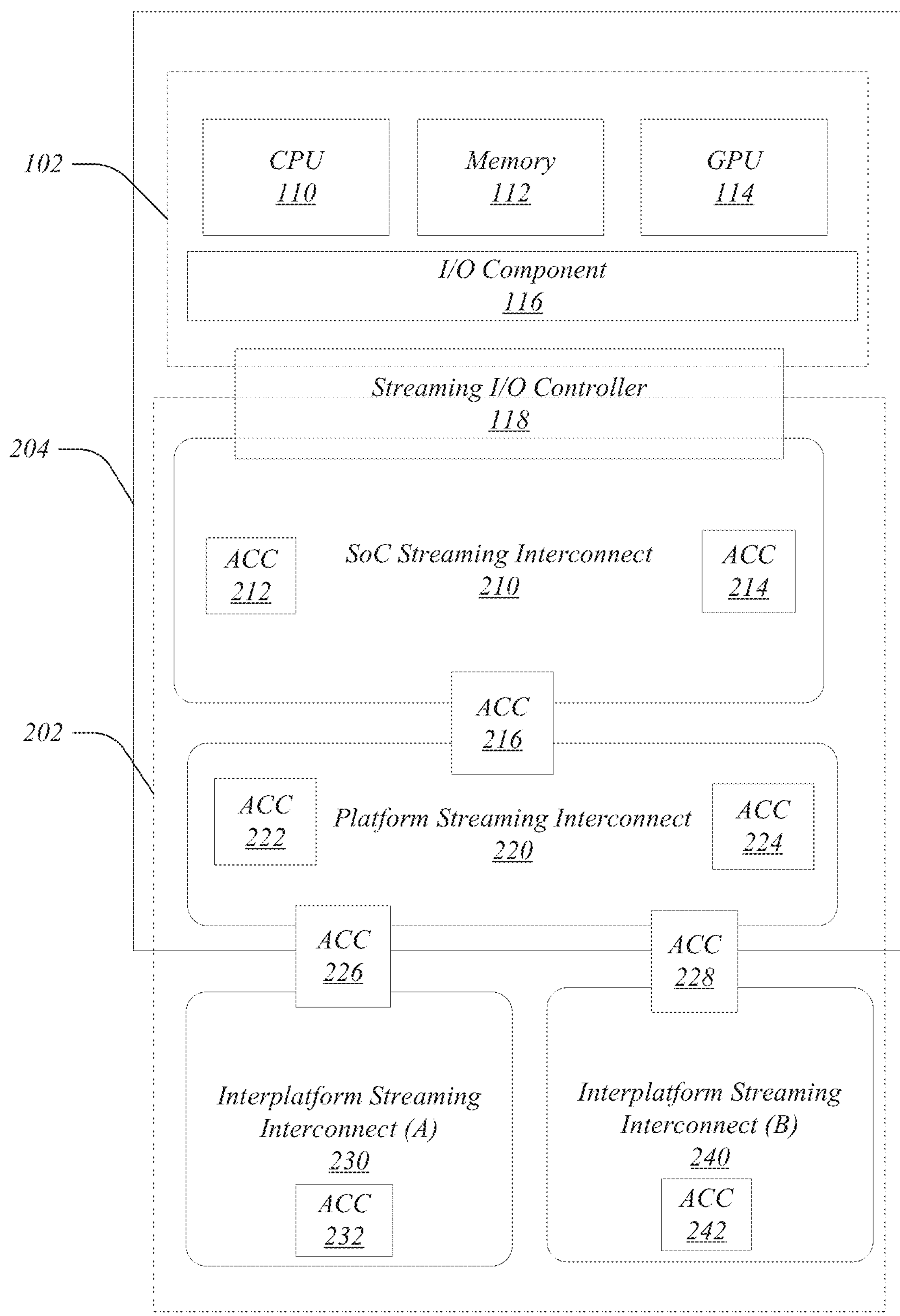
FIG. 2 illustrates another SIO architecture consistent with additional embodiments.

FIG. 2 illustrates another SIO architecture 200 consistent with additional embodiments. The SIO architecture 200 may include the load/store domain 102 as described above and an I/O streaming domain 202. In this embodiment the load/store domain 102 and a portion of the I/O streaming domain 202 are embodied in a platform 204, which may be a computer, communications device, hybrid device, mobile device, gaming device, or other hardware in different variants. However, the I/O streaming domain 202 includes multiple I/O streaming interconnects and extends beyond the platform 204 as shown in FIG. 2. In particular, an SoC streaming interconnect 210 is interfaced with the load/store domain 202 via the streaming I/O controller 118. The SoC streaming interconnect 210 may include at least one accelerator as illustrated by accelerators 212, 214, which may operate to manage I/O data streaming between components in a system-on-a-chip hardware component. An additional platform-level streaming interconnect is contained in the platform 204 and illustrated as the platform streaming interconnect 220. The SoC streaming interconnect 210 is coupled to the platform streaming interconnect 220 via an accelerator 216 as shown. The platform streaming interconnect 220 may include at least one accelerator such as the accelerators 222, 224 which may aid in management of I/O data streaming at the platform level.

The I/O streaming domain further includes an interplatform streaming interconnect (A) 230 and includes an interplatform streaming interconnect (B) 240 that are coupled to the platform streaming interconnect 220 via accelerators 226 and 228, respectively. Again each of these interplatform streaming interconnects may include at least one accelerator as illustrated by the accelerators 232, 242.

In the present embodiments, such as those illustrated in FIGS. 1 and 2, the composition of the elements of the I/O streaming domain, such as controllers, accelerators, and streaming interconnects, allows for constructing data flow graphs by routing data streams through one or more accelerators, where each accelerator performs a different processing on the data of a stream.

The scalable I/O architecture shown in FIGS. 1 and 2 provides a framework for constructing data flow graphs through accelerators anywhere they are actually located. The SIO architecture thus provides a flexible framework upon which power efficient offloading of data handling can be accomplished, which scale beyond platform boundaries.

Moreover the SIO architecture as particularly shown in FIG. 2 may facilitate I/O data movement in platforms separate from platform 204. This provides an example of how SIO architecture may facilitate I/O data processing across physical platform boundaries, including extending I/O data processing to remote devices and locations in a computing cloud. Thus, the SIO architecture also supports creation of new use models, such as the use of accelerators as a cloud based service. This architecture also creates a management plane for enumeration and management of I/O controllers, accelerators, and streaming interconnects in the streaming domain. The SIO architecture also creates a framework to expose accelerators connected to an I/O streaming domain in both 'legacy mode,' e.g., using an existing driver for the device through a Peripheral Component Interconnect Express (PCIe) streaming controller interface, as well as a 'streaming mode,' e.g., ability to use the device in a streaming data flow, as illustrated below.

Figure 3:
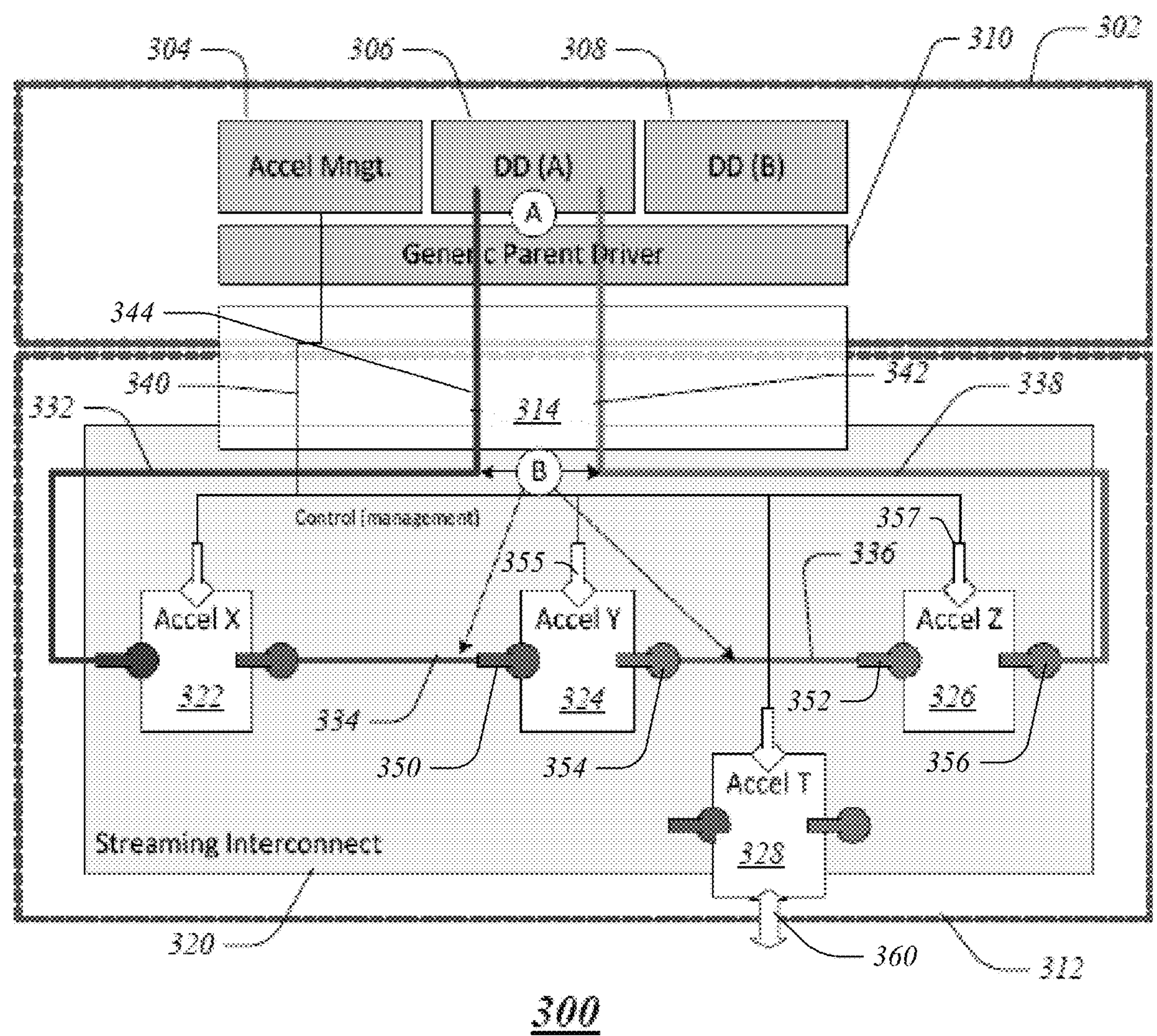
FIG. 3 depicts one scenario of processing data in a streaming I/O architecture 300 consistent with the present embodiments.

FIG. 3 depicts one scenario of processing data in a streaming I/O architecture 300 consistent with the present embodiments. A software stack designated by label A is provided in a load/store domain 302. The software stack A is arranged to expose I/O devices individually and allows management of data flows. This software stack A includes an accelerator management component 304, driver 306, driver 308, and generic parent driver 310 that may communicate with accelerators in an I/O streaming domain 312 via a streaming I/O controller 314. The software stack A may be further partitioned such that the generic parent driver 310 manages the data movement types and device drivers 306, 308 manage individual accelerators 322-328 and their respective data format types. Each accelerator may be implemented with multiple pins. For example accelerator 324 includes an input pin 350, output pin 354, and control pin 355 to receive control signals. Similarly, accelerator 326 includes an input pin 352, output pin 356, and control pin 357 to receive control signals. The same may apply to the other accelerators 322, 328. Moreover, the accelerator 328 features external data port 360, providing an interface towards other existing I/O technologies (not shown).

Also shown in FIG. 3 is a data flow graph B that is created in the streaming interconnect 320 and includes typed data flow segments 332, 334, 336, and 338. In the example of FIG. 3, a data flow is initiated by the software stack A in the load/store domain 302 and flows into and out of the I/O streaming domain 312 through the data flow segments, 332, 334, 336, 338, in that order. For example an application may require certain tasks to be performed that capable of execution by the streaming I/O domain 312. The data to be output may then be sent by the software stack A via the streaming I/O controller 314 to the streaming I/O domain 312. The resultant data flow segments that are created in the data flow graph B are bounded by a series of accelerators 322, 324, 326 that process the data flow graph B. Each accelerator 322, 324, 326 receives a data flow segment 332, 334, and 336 as a respective input and outputs the respective data flow segment 334, 336, and 338. The data flow graph B returns to the software stack A at the data flow segment 338. Each of the data flow segments 332, 334, 336, and 338 may be characterized by a different combination of data format type and data movement type. Also shown in FIG. 3 is an accelerator 328 which is available in the I/O streaming domain 312, but not configured as part of data flow graph B.

As shown in FIG. 3, the accelerator management component 304 generates control signaling 340 which includes signals to the accelerators 322-328. The control signaling 340 may instruct the respective accelerators as to how to establish a logical data flow, including an address that represents the device such as a next accelerator to receive the output data from a given accelerator.

One advantage provided by the SIO architecture as particularly exemplified in FIG. 3 is that I/O data can be streamed in a peer-to peer manner through multiple devices without the intervention of the load/store domain 302. Thus, in the data graph B, which employs three different accelerators, 322, 324, 326 to process the streaming data, between points 344 and 342 the data flow does not cross the boundary between load/store domain 302 and I/O streaming domain 312. In this manner, no CPU involvement is required, nor any memory access events in main (system) memory (not shown) of the load/store domain 302. In particular, this allows applications that are aware of the I/O streaming domain 312 to configure and initiate the data flow processing of streaming domain-resident accelerators, as exemplified by accelerators 322,324,326. Once initiated, the data flow processing in the streaming I/O data domain regime 304 can proceed autonomously, bypassing the host CPU (not shown) of the load/store domain 302 entirely. This enables a host such as a CPU, GPU, or other platform components (not shown) to enter lower power states for longer periods of time since no DMA or other similar operations are called for during the streaming data processing in the I/O streaming domain 312.

Another advantage of the SIO architecture of the present embodiments is that from an application software perspective the exact location of accelerators such as accelerators 322-328, that are used to process the streaming I/O data, is not important as long as the accelerators can meet the application's requirements. Moreover, the construction of a data graph to process streaming I/O data in a streaming I/O data domain is device agnostic: given knowledge of the data movement type and data format type, the streaming I/O data may be processed through a series of different devices (accelerators) without the need to provide device-specific information between peer devices. In other words, because the ability of devices to communicate data among each other depends on recognition of the data format type and data movement type, there is no need for a receiving device or sending device to have or obtain device information of its peer device.

In sum, the SIO architecture presented in the present embodiments provides multiple features not found in conventional I/O architecture. This helps in particular to address the system-level architectural inefficiencies of conventional Load/Store architectures, in their ability to handle streaming data. The SIO architecture is also specifically arranged for handling streaming data and seamlessly co-existing with conventional Load/Store architectures. By avoiding the use of CPU/memory resources in a load/store domain when not needed, the SIO architecture enables much better overall utilization of system resources, leading to, e.g., considerable power savings for a wide class of common applications including multimedia playback.

Notably, although the embodiment of FIG. 3 depicts a data graph that begins and ends in a load/store domain, in other embodiments one or more ends of a data graph may terminate outside of a load/store domain. Since the accelerators in the present embodiments may act as interfaces to standard I/O devices, in some embodiments workloads may be processed through a streaming domain without routing data through the load/store domain at all. For example, an MP3 file may be received by a wireless accelerator configured in the streaming domain, may then be processed through one or more (decode, equalizer, etc.) accelerators, and output through an accelerator attached to a speaker, without any involvement of load/store domain components.

Several beneficial features of the SIO architecture include the ability to efficiently process data streams. In particular, the SIO architecture affords the ability to dynamically select the most appropriate available data transfer/data processing elements to fulfill a given task, in some cases allowing the bypass of CPU and main memory entirely. The SIO architecture also provides support for dynamic detection, usage and release of compatible streaming domain I/O resources such as accelerators, FIFO buffers, and so forth. The SIO architecture additionally provides for extending a streaming domain in a manner that is software-transparent, thus facilitating creation of virtual I/O space. The SIO architecture also provides support for dynamic I/O domain reconfiguration, which may be based on a desired metric, such as energy efficiency.

Moreover, the use of accelerators to transform data in the SIO architecture is implementation agnostic, only requiring compliance with communication and configuration/monitoring rules. This may serve as the basis for creating an open specification around which an industry ecosystem can evolve.

The SIO architecture may also configure accelerators with multiple access points for moving data within a streaming domain, such as input pins, output pins and control pins, as well as an optional external data port for communication outside the streaming domain. The SIO architecture also operates so that a remote streaming domain I/O device appears as a local conventional I/O device to a host operating system.

As mentioned above, another novel aspect of the SIO architecture illustrated particularly in FIG. 2 is its scalability, that is, the capability to logically extend a "streaming domain" beyond a single platform/SoC. The SIO architecture capability of creating data processing graphs that can span user devices and the Cloud opens opportunities for new applications. SIO allows an I/O subsystem, typically implemented in circuitry outside of a CPU, to be extended by addition of logic that supports streaming I/O.

The SIO architecture also facilitates the access and use of components that reside in a streaming domain via conventional load/store methods, and provides compatibility of such components with conventional software, although such implementations may not enjoy benefits of the streaming domain features disclosed herein.

Moreover, the SIO architecture defines a standard method for streaming data between two devices, such as accelerators, as well as a standard method for describing data transfers in a streaming domain and interface to a load/store domain. In various embodiments the SIO architecture may support defining many "Pins" per device interface to its streaming interconnect, each with fully independent flow-control. The cost of implementing a pin is low, making it easy for accelerators to utilize hardware managed flow control, even if support of hundreds of data streams is needed. Another advantage of the SIO architecture is that a single "request" type is permitted over a single pin, thereby eliminating blocking conditions that may result in deadlock, and thus reducing "cost" of a pin. In various embodiments, the SIO architecture may employ a combination of bandwidth metering and two priority levels to guarantee the timely and reliable delivery of real-time I/O data over hundreds of pins simultaneously, which is an advantage since hardware support for real-time data is increasingly valued for modern usage models.

Moreover, in the present embodiments of SIO architecture, each data pin may serve an independent, flow-controlled data stream. In particular, through a streaming I/O controller an SIO pin can be mapped to a transfer ring in system memory. This, thus SIO architecture may provide a consistent representation of an I/O data stream that spans both the streaming I/O domain and load/store domains.

Figure 4:
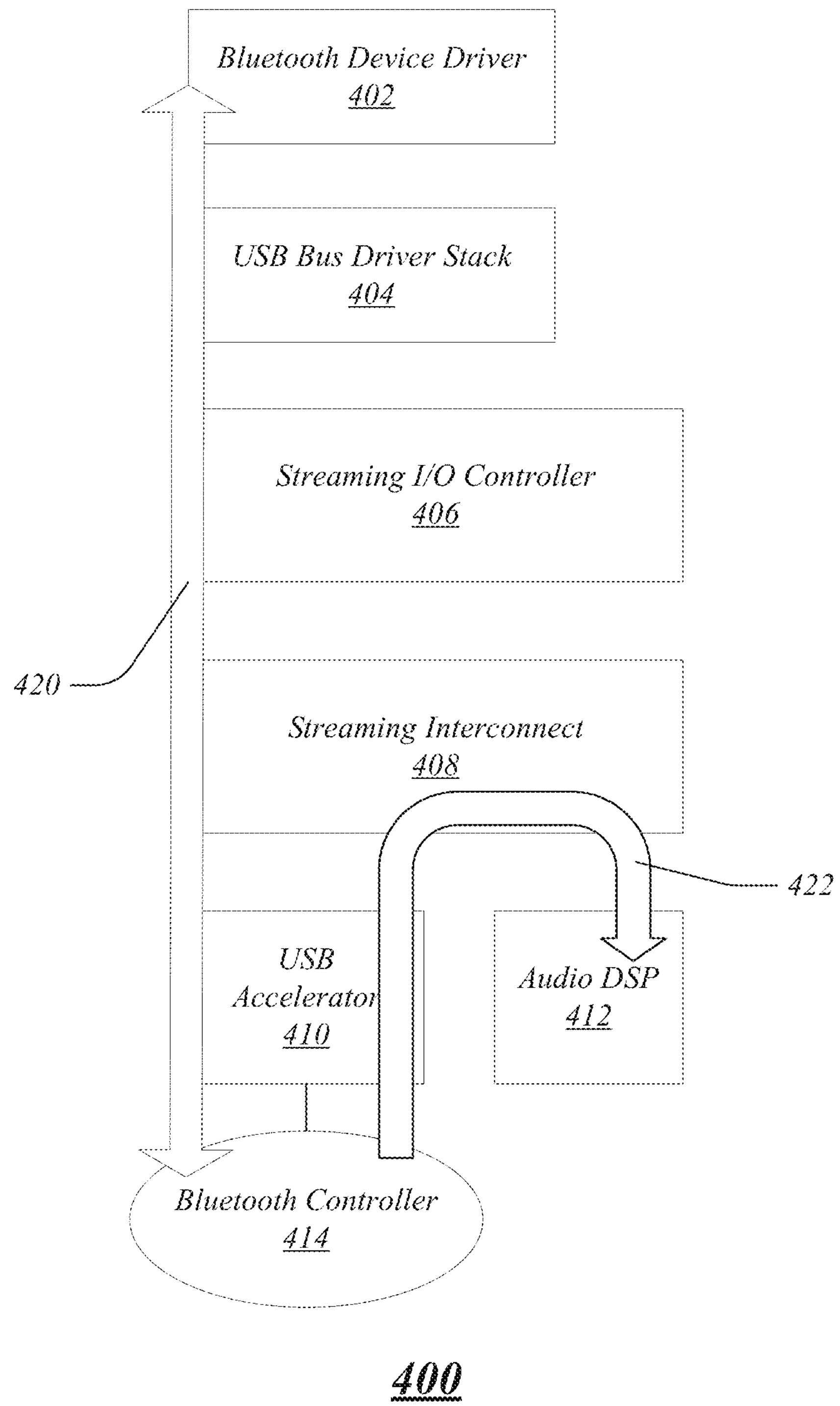
FIG. 4 depicts an exemplary use scenario that employs an SIO architecture.

Additional embodiments are further described below with respect to use scenarios that highlight various of the aforementioned advantages provided by SIO architecture. FIG. 4 depicts a use scenario that employs an SIO architecture 400 for Bluetooth® audio offload (Bluetooth is a trademark of the Bluetooth Special Interest Group (SIG), Inc., founded in 1998, a not-for-profit, non-stock corporation). The SIO architecture 400 includes an SIO universal host controller 406, streaming interconnect 408, USB accelerator 410 and audio digital signal processor (DSP) 412. The USB accelerator 410 is coupled to a Bluetooth controller 414. A Bluetooth device driver 402 and USB bus driver stack 404 may be present in a load/store domain (not shown) that interfaces with the USB accelerator 410 and audio digital signal processor (DSP) 412 via a streaming I/O controller 406, which may function as a DMA engine. The USB accelerator 410 may perform transactions to USB endpoints. In operation the SIO architecture 400 may operate in a conventional mode such that device endpoint data flows 420 are configured to flow through the USB accelerator 410, through streaming I/O controller 406, and finally to Bluetooth device driver endpoint queues in main memory (not separately shown). In another mode of operation that employs the streaming interconnect 408, the audio endpoint data flow can be routed via a configured data flow 422 directly to another hardware device such as the audio DSP 412. This approach provides a simpler interface for the legacy Bluetooth device, that is, one type of I/O pin, one driver stack, as compared to conventional approaches that may require at least four interfaces to a Bluetooth controller. The SIO architecture 400 also provides a flexible framework for offload that supports easy rerouting of an audio stream to any appropriate sink in the platform, such as a DSP, legacy driver, and so forth.

Figure 5:
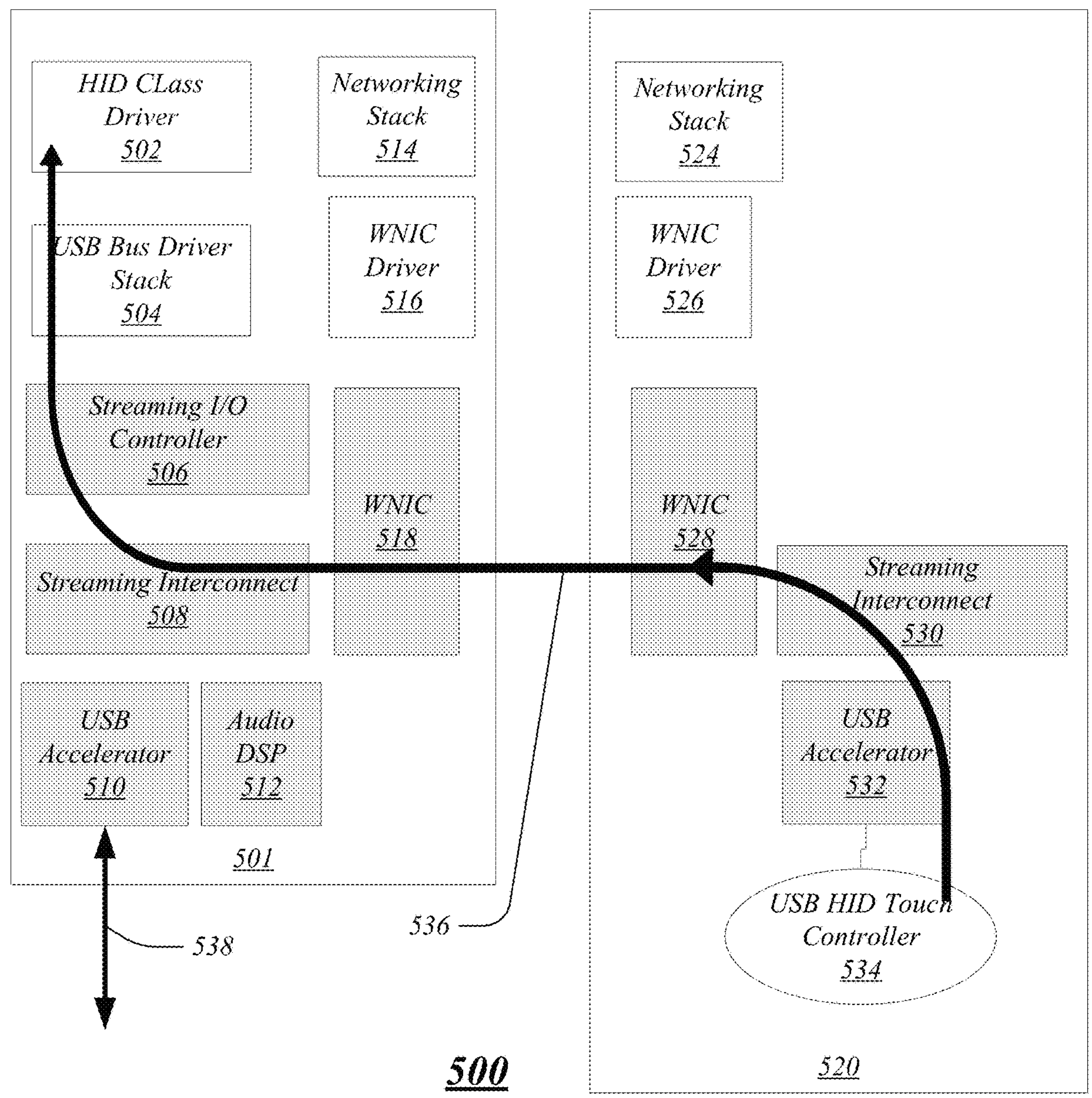
FIG. 5 depicts another exemplary use scenario and SIO architecture.

FIG. 5 depicts another use scenario and SIO architecture 500, which may be used to implement a remote USB processing. Recently the coupling to display devices via local wireless technology has evolved to require the remote display to also provide USB services, such as a touch screen device, and to provide USB ports to allow a user to add devices to the system, such as a thumb drive that contains images. In accordance with the embodiment of FIG. 5, a scalable I/O implementation is presented to perform USB data transfer remotely. In FIG. 5, a platform 501 interfaces over a wireless link (not shown) to a display device 520. The platform 501 includes a Human Interface Device (HID) class driver 502, USB Bus driver stack 504, Network stack 514, and wireless network interface controller (WNIC) driver 516, all of which may be conventional components resident in a load/store domain. The platform 501 further includes a streaming I/O controller 506, streaming interconnect 508, USB accelerator 510, audio DSP 512, and WNIC 518.

Turning now to the display device 520 a networking stack 524 and WNIC driver 526 are provided as well as a WNIC 528. The display device 520 further includes a streaming interconnect 530 and USB accelerator 532, which is coupled to a USB HID Touch Controller 534.

In one scenario the platform 501 and display device 520 may first discover each other. Subsequently, the USB HID touch controller 534, which is connected to USB accelerator 532 on the display device 520 may be enumerated as a device through the streaming I/O 506 resident on the platform 501. A software component may be employed to make the platform 501 aware of the USB accelerator 532, but additional data flows (see data flow 536) are such that they are host software-transparent. Communication between WNIC 518 and WNIC 528 may be conducted over any convenient protocol, such as WiFi Direct® (WiFi Direct is a trademark of Wi-Fi Alliance). This may allow communications to take place without need for a tall network stack due to the robustness of WNIC components. Accordingly, latency may be reduced, security increased, and cost reduced in the display device 520, since computational requirements for the display device 520 are reduced and USB functionality is provided by a hardware accelerator.

Figure 6:
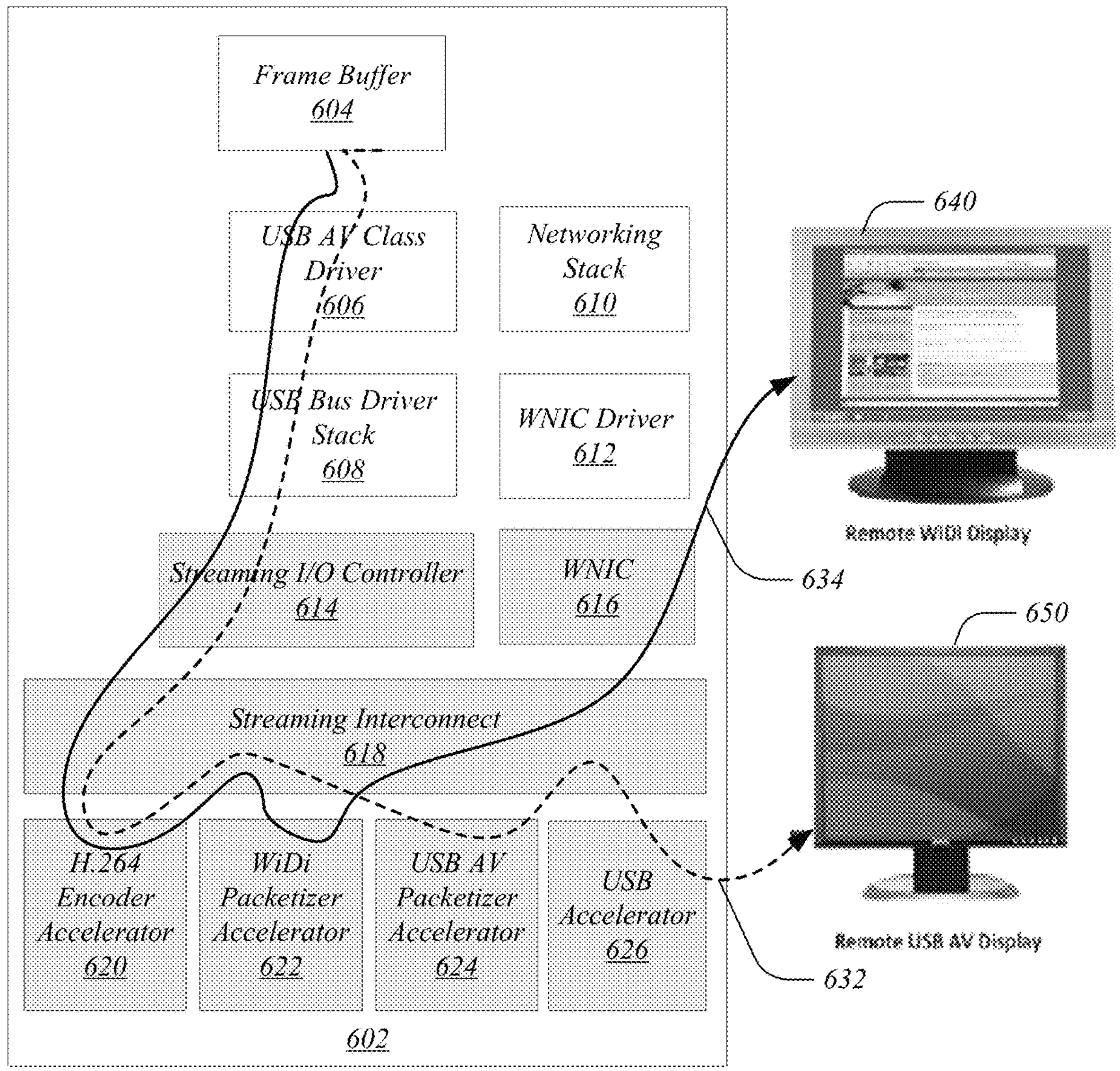
FIG. 6, illustrates a further exemplary use scenario and SIO architecture.

Turning now to FIG. 6, there is shown another scenario and SIO architecture 600 consistent with further embodiments. The scenario of FIG. 6 specifically depicts using scalable I/O to support communications with different remote display devices. As shown in FIG. 6, the platform 602 may communicate with a remote display 640 and remote display 650. In one example the remote display 640 may be linked via WiDi® to the platform 602 (WiDi is a trademark of Intel corporation). A remote display 650 may also be linked to platform 602 via USB Audio/Video (AV). The platform 602 may include an HID class driver 606, USB bus driver stack 608, networking stack 610, and an WNIC driver 612. In a SIO streaming domain (not separately shown), the platform 602 may include a streaming I/O controller 614, WNIC 616, streaming interconnect 618, and multiple accelerators such as an H.264 encoder accelerator 620, WiDi packetizer accelerator 622, USB AV packetizer accelerator 624, and USB accelerator 626.

In the scenario of FIG. 6, two different data flows 634 and 632 are illustrated between the platform 602 and respective remote displays, 640 and 650. The data flows originate from a frame buffer 604 that is resident in a load/store domain, such as in system memory (not shown) of the platform 602. The frame buffer 604 may be used to stream video content such as a movie to the remote display 640 or remote display 650. As noted, in this example, a variety of accelerators are connected to the streaming interconnect 618. A secondary port (not shown) may be provided to the WNIC 616 in addition to a primary WNIC port that is connected to a system bus and WNIC Driver 612.

In the present embodiments, the use of a hardware H.264 encoder accelerator 620 allows the platform 602 to process a movie in real time for display without exceeding its thermal envelope. It is to be noted that in conventional processing, a CPU (not shown) in the load/store domain may in principle encode a movie in real-time. However to encode video content in real time that exceeds more than a short clip, a CPU processor would likely exceed the thermal envelope of the platform 602. Moreover, the consumption of power during such encoding may reduce battery life substantially.

In one scenario illustrated in FIG. 6, once the platform 602 has discovered a WiDi display, that is, the remote display 640, a data flow 634 is configured through the streaming interconnect 618 to route data from the frame buffer 604, to the H.264 Encoder accelerator 620, to the WiDi Packetizer accelerator 622, and finally through the WNIC 616 to the remote display 640. This data flow 634 encodes video frames output from the frame buffer 604 and renders them in form compatible for reception by a WiDi device (remote display 640) without involvement of CPU and memory in a load/store domain, and accordingly consumes less power in processing a video.

In an alternative scenario, once the platform 602 has discovered a USB AV Display, that is, display 650, a data flow 632 is configured through the streaming interconnect 618 to route data from the frame buffer 604 to the H.264 Encoder accelerator 620, to the USB AV packetizer accelerator 624, and finally through the USB host accelerator 626 to the remote display 650.

In both scenarios, software assistance may take place in order to make the host, i.e., the platform 602, aware of the new remote displays 640, 650 and to configure the data flows 634, 632, but once a data flow has been established the video rendering process is host software-transparent and does not implicate DMA operations to main memory.

In a further scenario, the data flows 632 and 634 may be established concurrently so that both display 640 and display 650 present a streaming video at the same time. Because the data flows 632, 634 do not route through the load/store domain after exiting the frame buffer 604, USB Audio/Video class driver 606, and USB bus driver stack 608, the simultaneous operation of both data flows 632, 634 increase power consumption only a very modest amount.

Figure 7:
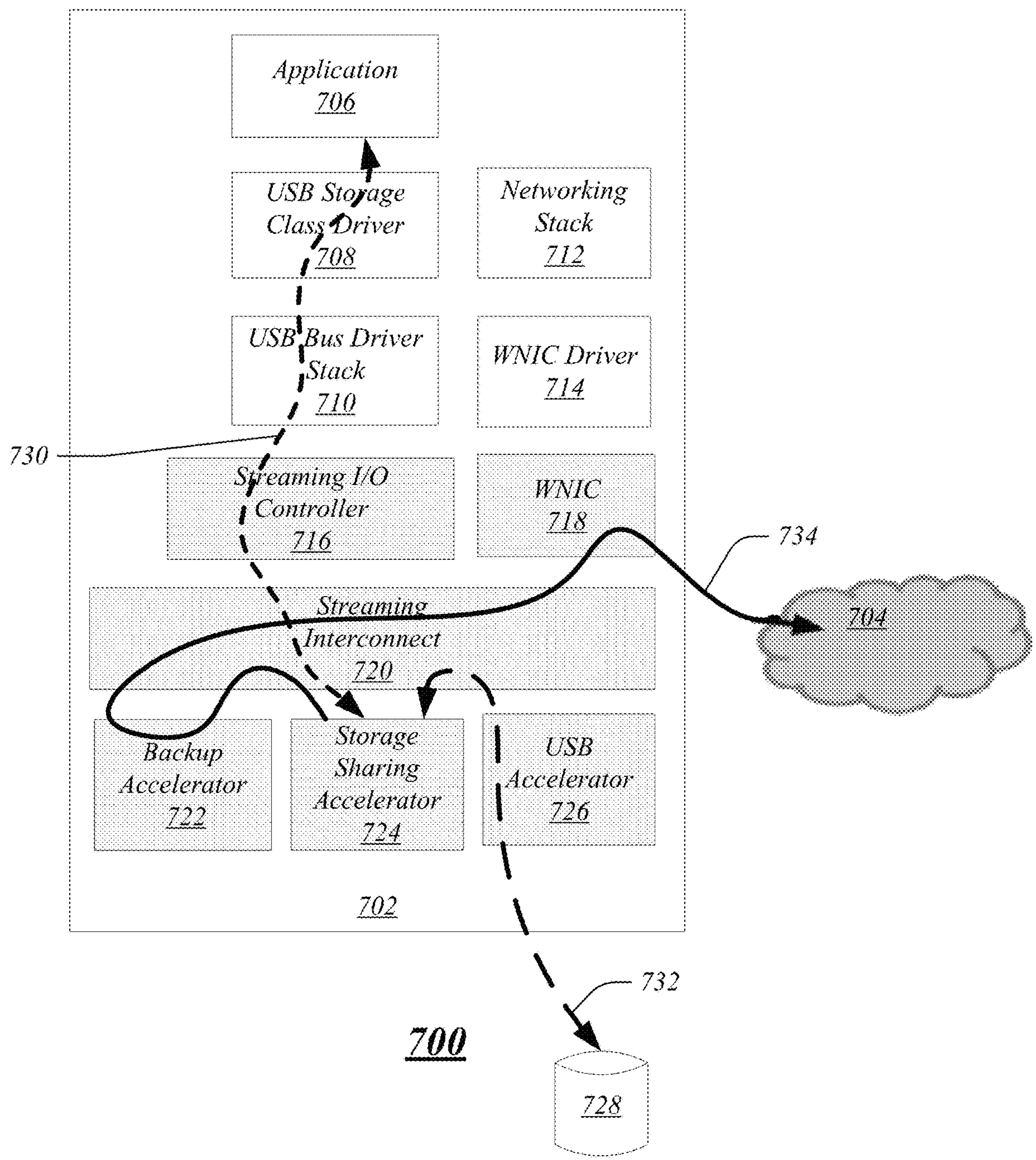
FIG. 7 shows another yet another use scenario and SIO architecture.

Turning now to FIG.7, there is shown another scenario and SIO architecture 700 consistent with further embodiments. The scenario of FIG. 7 specifically depicts using scalable I/O to support storage sharing. As illustrated, a platform 702 may be coupled to a remote storage 704 and to a storage drive 728, which may be local to the platform 702. The platform 702 may include USB Storage class driver 708, USB bus driver stack 710, networking stack 712, and WNIC driver714. In SIO streaming domain (not separately shown), the platform 702 may include a streaming I/O controller 716, WNIC 718, streaming interconnect 720, and multiple accelerators such as backup accelerator 722, storage sharing accelerator 724, and USB accelerator 726.

FIG. 7 illustrates an example of a storage sharing accelerator 724, which makes the local drive 728, which is attached to the USB Accelerator 726, appear as though it is dual ported although it is only singly ported. In this scenario one port is accessed normally by the operating system represented by application 706, as illustrated by data flows 730, 732. The other port is connected to the backup accelerator 722. The backup accelerator 722 may be equipped for streaming an image of the local drive 728 to a remote cloud storage service, exemplified by remote storage 704, while the rest of the platform 702 is sleeping. This is exemplified by the data flows 732, 734 which do not involve components of a load/store domain.

It is to be noted that there are many instances in present day data storage in which management engines and other platform subsystems may want to have hidden access to system storage devices. In present technology, all these entities must route their requests through an OS because drives are single ported, and that port is owned by the OS. The storage sharing accelerator 724 enables sharing of system storage, transparently to the OS.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
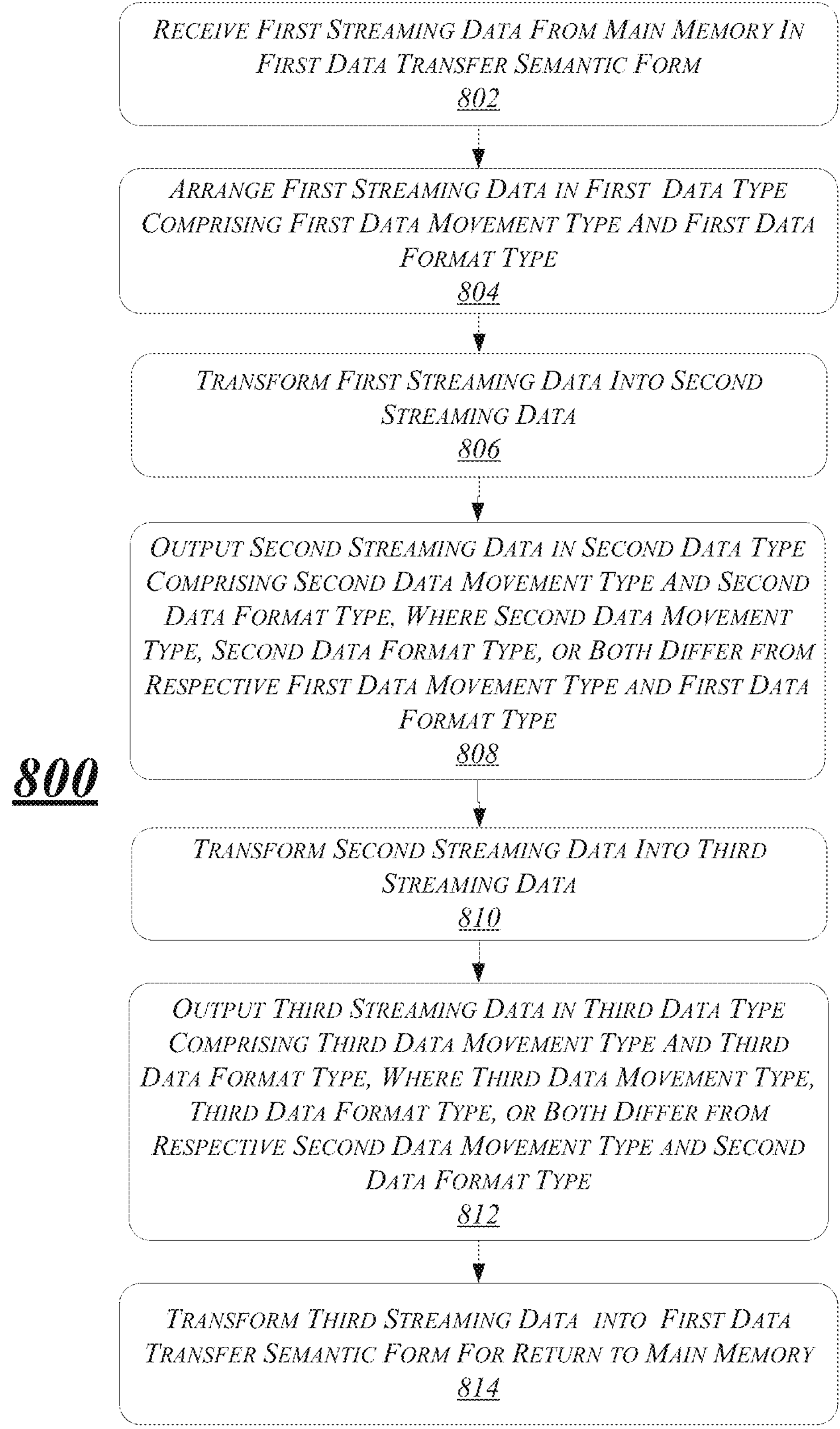
FIG. 8 shows an exemplary first logic flow.

FIG. 8 illustrates an exemplary first logic flow 800. At block 802 a first streaming data is received from main memory in a first data transfer semantic form. The streaming data may be in form appropriate for processing by components of a load/store domain such as CPU, GPU, and main memory.

At block 804, the first streaming data is arranged in a first data type that includes a first data movement type and first data format type, where the data movement type may identify characteristics that are specific to transporting streaming data over a streaming connection, and data format type may identify format and other characteristics of streaming data not related to data movement.

At block 806 the first streaming data is transformed into second streaming data. Examples of data transformation include extracting MP3 encoded data from Ethernet frames, transforming MP3 data into audio sample data, transforming encode video data into packetized data for wireless transmission, and other operations. In some examples, the transforming may be performed by a first hardware accelerator.

At block 808 the second streaming data is output in a second data type comprising a second data movement type and second data format type, where the second data movement type, second data format type, or both differ from respective first data movement type and first data format type. The second data type may be appropriate for reception of the second streaming data by a further component such as a second hardware accelerator to process the second streaming data.

At block 810, the second streaming data is transformed into third streaming data. At block 812 the third streaming data is output in a third data type comprising a third data movement type and third data format type, where the third data movement type, third data format type, or both differ from respective second data movement type and second data format type. The third data type may be appropriate for reception of the third streaming data by a further component such as a third hardware accelerator to process the third streaming data. At block 814, the third streaming data is transformed into the first data transfer semantic form for return to main memory.

Figure 9:
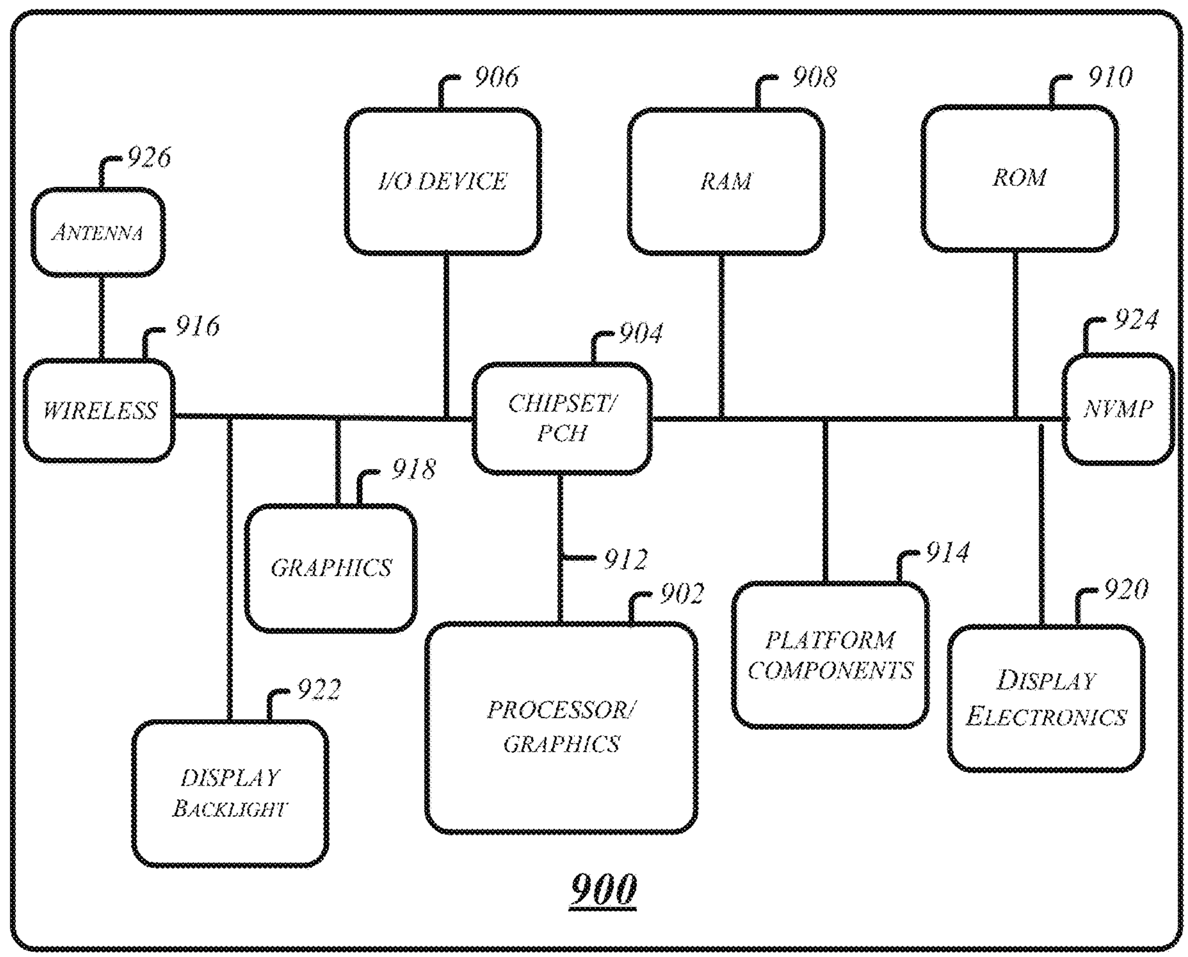
FIG. 9 illustrates an exemplary system architecture.

FIG. 9 is a diagram of an exemplary system embodiment and in particular, FIG. 9 is a diagram showing a system 900, which may include various elements. For instance, FIG. 9 shows that system (platform) 900 may include a processor/graphics core, termed herein processor 902, a chipset/platform control hub (PCH), termed herein chipset 904, an input/output (I/O) device 906, a random access memory (RAM) (such as dynamic RAM (DRAM)) 908, and a read only memory (ROM) 910, display electronics 920, display backlight 922, and various other platform components 914 (e.g., a fan, a crossflow blower, a heat sink, DTM system, cooling system, housing, vents, and so forth). System 900 may also include wireless communications chip 916 and graphics device 918, non-volatile memory port (NVMP) 924, and antenna 926. The embodiments, however, are not limited to these elements.

As shown in FIG. 9, I/O device 906, RAM 908, and ROM 910 are coupled to processor 902 by way of chipset 904. Chipset 904 may be coupled to processor 902 by a bus 912. Accordingly, bus 912 may include multiple lines.

Processor 902 may be a central processing unit comprising one or more processor cores and may include any number of processors having any number of processor cores. The processor 902 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 902 may be multiple separate processors located on separate integrated circuit chips. In some embodiments processor 902 may be a processor having integrated graphics, while in other embodiments processor 902 may be a graphics core or cores.

The following examples pertain to further embodiments.

In example 1, an apparatus for managing input/output (I/O) data includes a streaming I/O controller to receive data from a load/store domain component and output the data as first streaming data of a first data type comprising a first data movement type and first data format type; at least one accelerator coupled to the streaming I/O controller to receive the first streaming data, transform the first streaming data to second streaming data having a second data type different than the first data type, and output the second streaming data; and a streaming interconnect to conduct the second data to a peer device configured to receive data of the second data type.

In example 2, the load/store domain of example 1 may include a main memory to store the data and processor circuit to retrieve and to send the data to the streaming I/O controller.

In example 3, the streaming I/O controller of any of examples 1-2 may be to forward first data from the main memory to the streaming interconnect for processing by the at least one accelerator and transmit second data to the main memory that is received from the streaming interconnect after processing.

In example 4, the streaming interconnect of any of examples 1-3 may be coupled to a multiplicity of accelerators, and the processor may be configured to generate a data flow graph comprising a multiplicity of data flow segments that each links a pair of accelerators or an accelerator to the streaming I/O controller, each data flow segment comprising a different data movement type or different data format type than the each other data flow segment, a data movement type to identify characteristics that are specific to transporting streaming data over a streaming connection, and data format type to identify format and other characteristics of streaming data not related to data movement.

In example 5, the at least one accelerator of any of examples 1-4 may include a multiplicity of accelerators, the streaming interconnect to conduct streaming data between the multiplicity of accelerators for processing without use of the main memory.

In example 6, the streaming I/O controller of any of examples 1-5 may be to implement a control path for configuration and monitoring of the at least one accelerator.

In example 7, the data movement type of any of examples 1-6 may comprise information specific to transporting data over a streaming connection, the streaming interconnect to identify data movement type and manage streaming data transfer using the data movement type.

In example 8, the streaming interconnect of any of examples 1-7 may be to identify data format information and other characteristics of a data stream that are not related to data movement In example 9, each accelerator of the at least one accelerator of any of examples 1-8 may include an input pin, output pin, and control pin to receive control signals from the load/store domain.

In example 10, at least one accelerator of any of examples 1-9 may be to manage signaling or protocol to transfer I/O data from a data source to the input or to transfer data from the output to an I/O data sink.

In example 11, the load/store domain component of any of examples 1-10 may form part of a load/store domain that includes a general processor circuitry (CPU) and main memory, the streaming I/O controller, streaming interconnect, and at least one accelerator comprising a first streaming domain located on a platform that is common to the load/store domain.

In example 12, the apparatus of any of examples 1-11 may include a bridge accelerator to conduct data between the first streaming I/O domain and a second streaming I/O domain that is not located on the platform.

In example 13, the at least one accelerator of any of examples 1-12 may be to receive a control signal from the load/store domain that indicates an address of the peer device.

In example 14, the apparatus of any of examples 1-13 may include a multiplicity of first-in-first-out (FIFO) buffers to be dynamically sized and linked to the at least one accelerator.

Example 15 is at least one computer-readable storage medium that includes instructions that, when executed, cause a system to: retrieve data from memory; transmit the retrieved data to a first device as first streaming data of a first data type comprising a first data movement type and first data format type; transform the first streaming data to second streaming data having a second data type different than the first data type; and transmit the second streaming data to a second device, the second device configured to receive data of the second data type.

In example 16 the at least one computer-readable storage medium of example 15 may include instructions that, when executed, cause a system to: forward first data from the memory to a streaming interconnect for processing by at least one accelerator and transmit second data to the memory that is received from the streaming interconnect after processing.

In example 17 the at least one computer-readable storage medium of any of examples 15-16 may include instructions that, when executed, cause a system to conduct streaming data between a multiplicity of accelerators for processing without use of the memory.

In example 18 the at least one computer-readable storage medium of any of examples 15-17 may include instructions that, when executed, cause a system to implement a control path for configuration and monitoring of the at least one accelerator.

In example 19 the at least one computer-readable storage medium of any of examples 15-18 may include instructions that, when executed, cause a system to identify data format information and other characteristics of a data stream that are not related to data movement.

In example 20 the at least one computer-readable storage medium of any of examples 15-19 may include instructions that, when executed, cause a system to: transform the second streaming data to third streaming data having a third data type different than the second data type; and transmit the third streaming data to a third device, the third device configured to receive data of the third data type, without returning the second streaming data or third streaming data to the memory.

In example 21 the at least one computer-readable storage medium of any of examples 15-20 may include instructions that, when executed, cause a system to: receive a control signal at the first device that indicates an address of the second device.

In example 22 the at least one computer-readable storage medium of any of examples 15-21 may include instructions that, when executed, cause a system to: store the second streaming data in a first-in-first-out (FIFO) buffer before the transmitting to the second device.

In example 23, a method of managing input/output (I/O) data includes: retrieving data from memory; transmitting the retrieved data to a first device as first streaming data of a first data type comprising a first data movement type and first data format type; transforming the first streaming data to second streaming data having a second data type different than the first data type; and transmitting the second streaming data to a second device, the second device configured to receive data of the second data type.

In example 24, the method of example 23 may include: forwarding first data from the memory to a streaming interconnect for processing by at least one accelerator; and transmitting second data to the memory that is received from the streaming interconnect after processing.

In example 25, the method of any of examples 23-24 may include: implementing a control path for configuration and monitoring of the at least one accelerator.

In example 26, the method of any of examples 23-25 may include: transforming the second streaming data to third streaming data having a third data type different than the second data type; and transmitting the third streaming data to a third device, the third device configured to receive data of the third data type, without returning the second streaming data or third streaming data to the memory.

In example 27, data movement type of any of examples 23-26 may include information specific to transporting data over a streaming connection, the streaming interconnect to identify data movement type and manage streaming data transfer using the data movement type.

In example 28, the method of any of examples 23-27 may include receiving a control signal at the first device that indicates an address of the second device.

In example 29, the method of any of examples 23-28 may include storing the second streaming data in a first-in-first-out (FIFO) buffer before the transmitting to the second device.

Example 30 is user equipment to manage I/O data comprising means to perform the method of any of examples 23-29.

Example 31 is an apparatus to manage I/O data comprising means to perform the method of any one of examples 23-29.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one computer readable storage device comprising computer readable instructions that, when executed, cause at least one processor associated with a cloud based service to at least:

access first video data from a first data storage location, the first video data having a first format;

cause a first accelerator associated with the cloud based service to transform a portion of the first video data to a second video data portion having a second format different from the first format;

cause the second video data portion to be stored;

cause a second accelerator associated with the cloud based service to transform at least the second video data portion into at least one first data segment formatted to stream to a first device; and cause a third accelerator associated with the cloud based service to transform at least the second video data portion into at least one second data segment formatted to stream to a second device, the at least one second data segment in a different format than the at least one first data segment, the at least one first data segment and the at least one second data segment to be streamable concurrently.

2. The at least one computer readable storage device of claim 1, wherein the second format corresponds to H.264.

3. The at least one computer readable storage device of claim 1, wherein the instructions cause the at least one processor to specify a bandwidth associated with the at least one first data segment.

4. The at least one computer readable storage device of claim 1, wherein the instructions cause the at least one processor to cause the first video data to be stored at the first data storage location.

5. A system comprising:

a first accelerator associated with a cloud based service;

a second accelerator associated with the cloud based service;

a third accelerator associated with the cloud based service;

at least one storage device; and at least one processor associated with the cloud based service, the at least one processor to:

access first video data from a first data storage location, the first video data having a first format;

cause the first accelerator associated with the cloud based service to transform at least a portion of the first video data to a second video data portion having a second format different from the first format;

cause the second video data portion to be stored;

cause the second accelerator associated with the cloud based service to transform at least the second video data portion into at least one first data segment formatted to stream to a first device; and cause the third accelerator associated with the cloud based service to transform at least the second video data portion into at least one second data segment formatted to stream to a second device, the at least one second data segment in a different format than the at least one first data segment, the at least one first data segment and the at least one second data segment to be streamable concurrently.

6. The system of claim 5, wherein the second format corresponds to H.264.

7. The system of claim 5, wherein the at least one processor is to specify a bandwidth associated with the at least one first data segment.

8. The system of claim 5, wherein the at least one processor is to cause the first video data to be stored at the first data storage location.

9. A method comprising:

accessing first video data from a first data storage location, the first video data having a first format;

transforming, with a first accelerator associated with a cloud based service, a portion of the first video data to a second video data portion having a second format different from the first format;

causing the second video data portion to be stored;

transforming, with a second accelerator associated with the cloud based service, at least the second video data portion into at least one first data segment formatted to stream to a first device; and transforming, with a third accelerator associated with the cloud based service, at least the second video data portion into at least one second data segment formatted to stream to a second device, the at least one second data segment in a different format than the at least one first data segment, the at least one first data segment and the at least one second data segment to be streamable concurrently.

10. The method of claim 9, further including specifying a bandwidth associated with the at least one first data segment.

11. The method of claim 9, wherein the second format corresponds to H.264, and further including causing the first video data to be stored at the first data storage location.

12. At least one computer readable storage device comprising computer readable instructions that, when executed, cause at least one processor associated with a cloud based service to at least:

access first video data from a first data storage location, the first video data having a first format;

cause at least one accelerator associated with the cloud based service to transform a portion of the first video data to a second video data portion having a second format different from the first format;

cause the second video data portion to be stored;

cause the at least one accelerator associated with the cloud based service to transform at least the second video data portion into at least one first data segment formatted to stream to a first device; and cause the at least one accelerator associated with the cloud based service to transform at least the second video data portion into at least one second data segment formatted to stream to a second device, the at least one second data segment in a different format than the at least one first data segment, the at least one first data segment and the at least one second data segment to be streamable concurrently.

13. The at least one computer readable storage device of claim 12, wherein the second format corresponds to H.264.

14. The at least one computer readable storage device of claim 12, wherein the instructions cause the at least one processor to specify a bandwidth associated with the at least one first data segment.

15. The at least one computer readable storage device of claim 12, wherein the instructions cause the at least one processor to cause the first video data to be stored at the first data storage location.

16. A system comprising:

at least one accelerator associated with a cloud based service;

at least one storage device; and at least one processor associated with the cloud based service, the at least one processor to:

access first video data from a first data storage location, the first video data having a first format;

cause the at least one accelerator associated with the cloud based service to transform at least a portion of the first video data to a second video data portion having a second format different from the first format;

cause the second video data portion to be stored;

cause the at least one accelerator associated with the cloud based service to transform at least the second video data portion into at least one first data segment formatted to stream to a first device; and cause the at least one accelerator associated with the cloud based service to transform at least the second video data into at least one second data segment formatted to stream to a second device, the at least one second data segment in a different format than the at least one first data segment, the at least one first data segment and the at least one second data segment to be streamable concurrently.

17. The system of claim 16, wherein the second format corresponds to H.264.

18. The system of claim 16, wherein the at least one processor is to specify a bandwidth associated with the at least one first data segment.

19. The system of claim 16, wherein the at least one processor is to cause the first video data to be stored at the first data storage location.

20. A method comprising:

accessing first video data from a first data storage location, the first video data having a first format;

transforming, with at least one accelerator associated with a cloud based service, a portion of the first video data to a second video data portion having a second format different from the first format;

causing the second video data portion to be stored;

transforming, with the at least one accelerator associated with the cloud based service, at least the second video data portion into at least one first data segment formatted to stream to a first device; and transforming, with the at least one accelerator associated with the cloud based service, at least the second video data portion into at least one second data segment formatted to stream to a second device, the at least one second data segment in a different format than the at least one first data segment, the at least one first data segment and the at least one second data segment to be streamable concurrently.

21. The method of claim 20, further including specifying a bandwidth associated with the at least one first data segment.

22. The method of claim 20, wherein the second format corresponds to H.264, and further including causing the first video data to be stored at the first data storage location.

* * * * *